(12) United States Patent
Yoon

(10) Patent No.: US 8,675,888 B2
(45) Date of Patent: Mar. 18, 2014

(54) CAR AUDIO

(75) Inventor: Seong-Ho Yoon, Seoul (KR)

(73) Assignee: Namsung Co., Ltd., Seoul (KR)

( * ) Notice: Subject to any disclaimer, the term of this patent is extended or adjusted under 35 U.S.C. 154(b) by 711 days.

(21) Appl. No.: 12/849,880

(22) Filed: Aug. 4, 2010

(65) Prior Publication Data

US 2011/0311074 A1 Dec. 22, 2011

(30) Foreign Application Priority Data

Jun. 18, 2010 (KR) ........................ 10-2010-0058202

(51) Int. Cl.
*H04B 1/00* (2006.01)
(52) U.S. Cl.
USPC ............................................. 381/86
(58) Field of Classification Search
USPC ........ 381/86, 1, 300, 309, 302, 311; 361/725, 361/683
See application file for complete search history.

(56) References Cited

U.S. PATENT DOCUMENTS

| | | | |
|---|---|---|---|
| 5,033,709 A | 7/1991 | Yuen | |
| 5,086,958 A | 2/1992 | Nagy | |
| 5,414,770 A | 5/1995 | Wang | |
| 5,457,745 A | 10/1995 | Wang | |
| 5,529,271 A | 6/1996 | Dunchock | |
| 5,568,549 A | 10/1996 | Wang | |
| 6,036,071 A | 3/2000 | Hartmann et al. | |
| 6,056,175 A | 5/2000 | Mieglitz et al. | |
| 6,138,969 A | 10/2000 | Olausson | |
| 7,097,082 B2 | 8/2006 | Wallaker | |
| 8,059,830 B1 * | 11/2011 | Gleason et al. | 381/86 |
| 8,505,795 B2 | 8/2013 | Dunn | |
| 2003/0235144 A1* | 12/2003 | Eum et al. | 369/291 |
| 2006/0256475 A1* | 11/2006 | Lindsay et al. | 360/137 |
| 2007/0278274 A1 | 12/2007 | Dunn | |
| 2008/0110946 A1 | 5/2008 | Dixon et al. | |
| 2008/0190978 A1 | 8/2008 | Brassard | |
| 2010/0232117 A1* | 9/2010 | Yoon | 361/725 |

* cited by examiner

*Primary Examiner* — Lun-See Lao
(74) *Attorney, Agent, or Firm* — Hamre, Schumann, Mueller & Larson, P.C.

(57) ABSTRACT

Provided is a car audio, in which a holding unit where a portable media device is held is inserted in an insertion space formed through the font of a car audio body and the holding unit is drawn out by opening and closing the insertion space with a front panel unit. Therefore, it is possible to hold and use a portable media device in a vehicle and the holding unit is stored in the insertion space when the portable media device is not used.

12 Claims, 6 Drawing Sheets

CAR AUDIO

BACKGROUND OF THE INVENTION

1. Field of the Invention

The present invention relates to a car audio, and more particularly, to a car audio designed to simply hold and use a variety of portable media devices in a vehicle. This application claims priority to Korean Patent Application No. 10-2010-0058202 filed on Jun. 8, 2010, the entire contents of which are herein incorporated by reference.

2. Description of the Related Art

In general, car audios are audio systems installed in vehicles.

The car audios are usually installed at the center portion of the instrument panel in vehicles.

Common car audios include a deck where an audio medium, such as a compact disc or a cassette tape, is inserted, an operation panel for a user to operate it and a display panel showing the operation status inputted from the operation panel at the front.

The car audios allow the user to listen to music in a vehicle by inserting the existing audio media, such as compact discs and cassettes, in the deck and operating it.

The portable media devices include MP3 players, portable multimedia player (hereafter, referred to as PMP), smart phones, and tablets PCs.

More people are using the portable media devices.

The existing audio media has been replaced by the portable media devices.

Subsequently, more people increasingly require that they can charge and use the portable media devices in vehicles.

The existing car audios, however, are manufactured to operate the existing audio devices, such as music compact disc (CD) and cassette tape players.

Therefore, there was a problem in that it is difficult to connect and use the portable media devices that have been popularized in recent year.

The portable media devices have various sizes and shapes, depending on the manufacturers and the product models.

The portable media devices require an exclusive holding unit mounted in vehicles to be used in the vehicles.

The exclusive holding units have a problem of detracting from the appearance of the interior of vehicles and while being messy and interfering with safe driving.

Further, the exclusive holding units have difficulty in holding various portable medial devices.

In particular, the PMPs can play video as well as audio.

It is difficult to hold the PMPs in the vehicles.

Therefore, the users have difficulty in watching videos on the PMPs in the vehicles.

SUMMARY OF THE INVENTION

The present invention has been made in an effort to provide a car audio equipped with a holding unit that can be drawn out, if needed.

An exemplary embodiment of the present invention provides a car audio including: a holding unit where a portable media device is held; a car audio body mounted in a vehicle and having an insertion space formed through the front to insert the holding unit; and a front panel unit opening and closing the insertion space, in which the holding unit is drawn out, when the insertion space is open.

According to the exemplary embodiment of the present invention, it is possible to improve satisfaction for users by simply holding and using a portable media device in a vehicle.

According to the exemplary embodiment of the present invention, it is possible to improve the aesthetic appearance of the inside of a vehicle and safety, when the portable media device is not used, by drawing out the holding unit, only when it is needed.

In particular, the present invention further improves the user's satisfaction by making it possible to utilize various functions of PMPs even in a vehicle.

DETAILED DESCRIPTION OF THE PREFERRED EMBODIMENTS

Exemplary embodiments of the present invention are described hereafter in detail with the accompanying drawings.

Figure 1:
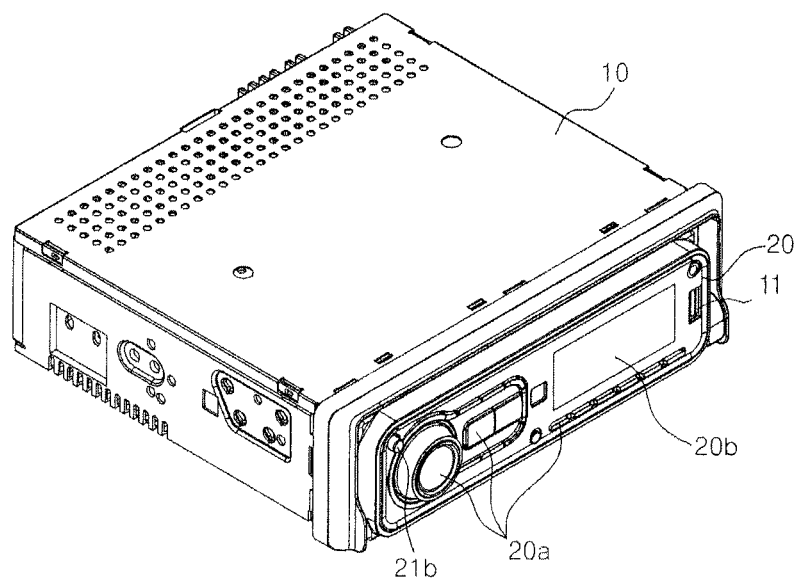
FIG. 1 is a front perspective view of a car audio according to an exemplary embodiment of the present invention.

A car audio according to an exemplary embodiment of the present invention includes, as shown in FIG. 1, a car audio body 10 that can be mounted in a vehicle and a holding unit 30 holding a portable media device 1.

The car audio body 10 has an insertion portion 12 formed through the front to insert the holding unit 30.

The car audio body 10 has a front panel unit 20 at the front to open and close the insertion space 12.

The insertion space 12 is a space of which the front is open and where the holding unit 30 is inserted, between the front of the car audio body 10 and the rear of the front panel unit 20.

At least any one of the audio devices, such as a radio, a compact disc player, a DVD player, and a cassette player, is installed in the car audio body 10 or the front panel unit 20.

The audio devices make it possible to use the existing audio media, such as the existing compact discs or cassette tapes, or listen to the radio.

Further, an operation unit 20a for operating the audio device and a display 20b for seeing the operation of the audio device may be provided on the front of the front panel unit 20.

The car audio body 10 or the front panel unit 20 may be provided with an expansion slot 11 to connect an external memory.

The expansion slot 11 includes a memory slot where a USB (Universal Serial Bust) or a memory card is directly inserted and connected, other connection terminals.

The expansion slot 11 may be variously modified in accordance with the connection structures of external memories.

Further, the expansion slot 11 may includes two or more memory connectors having different types of connection to use a plurality of various types of external memories.

The expansion slot 11 may be connected with a portable media device 1 through a terminal member (not shown) provided in the holding unit 30 to connect and use an external memory with the portable media device 1.

The expansion slot 11 is provided to connect and use an external memory and an independent portable media device 1 which cannot be held in the holding unit 30.

It should be understood that the external memory includes the memory included in the portable media device 1.

The front panel unit 20 is disposed at the front of the car audio body 10 to open and close the insertion space 12.

Figure 2:
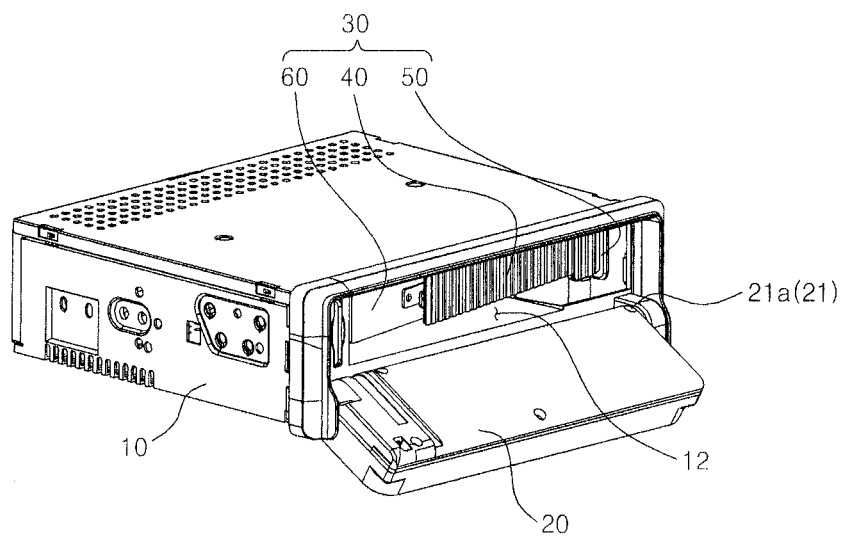
FIGS. 2 and 3 are perspective views illustrating when the car audio according to an exemplary embodiment of the present invention is used.
Figure 3:
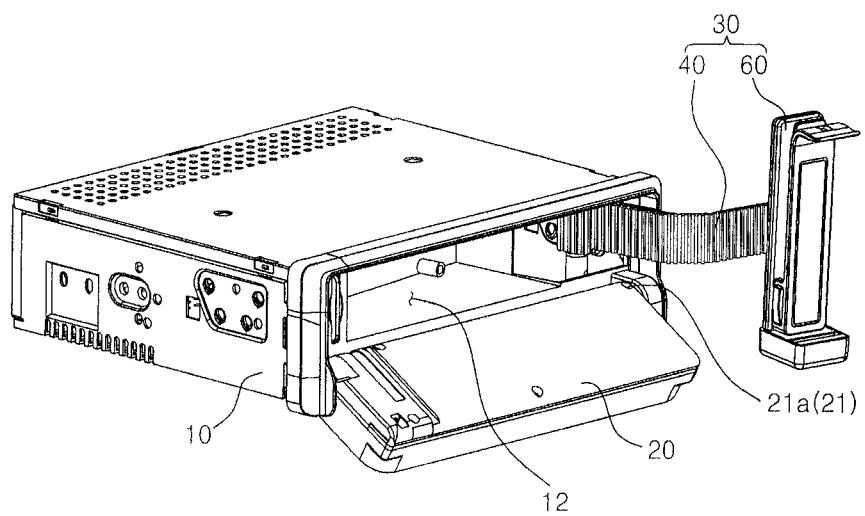

A panel hinge 21 rotatably connected to the car audio body, as shown in FIGS. 2 and 3, is provided at the sides of the front panel unit 20.

The panel hinges 21 are disposed at the lower portion of both sides of the front panel unit 20.

The front panel unit 20 rotates about the panel hinges 21 to open and close the insertion space 12 in the exemplary embodiment.

The panel hinges 21 include hinge shafts 21*a* protruding from the lower portions of both sides of the front panel unit 20 and a locking member (not shown) that locks and unlocks the front panel unit 20 closing the insertion space 12.

Though not shown, the locking member is locked where the front panel unit 20 closes the insertion space 12 and is unlocked by pressing a button 21*b* provided on the front of the front panel unit 20.

The locking member may be modified in any other structures as long as it is possible to lock and unlock the front panel unit 20 opened and closed, other than the above structure.

That is, the front panel unit 20 is unlocked by pressing the button 21*b* and rotated about the hinge shafts 21*a* by its own weight to open the insertion space 12. Further, the front panel unit 20 is lifted, with the insertion space 12 opened, and is locked by the locking member after closing the insertion space 12.

Further, the panel hinge 21 may further includes a damper (not shown) controlling the rotation speed of the front panel unit 20.

The damper is formed by a plurality of gears composed of a gear fitted on the hinge shaft 21*a* of the front panel unit 20 and a gear rotatably provided in the car audio body 10 to be engaged with the above gear in the exemplary embodiment.

The dampers control the rotation speed of the front panel unit 20, using the tooth ratio of the gears engaged with the dampers.

The front panel unit 20 can be smoothly opened by the operation of the dampers.

Meanwhile, the panel hinge 21 may be implemented as an electric type including an electric motor (not shown) rotating the hinge shaft 21*a*, a plurality of gears (not shown) transmitting the torque of the electric motor to the hinge shaft 21*a*, and an operation switch operating the electric motor.

Further, though not shown, the front panel unit 20 may slide on the front of the car audio body 10 to open and close the insertion space 12.

Further, though not shown, the front panel unit 20 may have a structured formed by combining a sliding structure with a rotating structure to open and close the insertion space 12.

It should be understood that the front panel unit 20 may be modified in various structures opening and closing the insertion space 12.

The holding unit 30 can be drawn out, when the insertion space 12 is opened by the front panel unit 20.

The holding unit 30 includes: a support 40 that is bendable; a main hinge 50 that is disposed in the car audio body 10 and where any one end of the support 40 is rotatably connected; and a device holder 60 that is connected to the other end of the support 40 to hold the portable media device 1.

The support 40, though not shown, connects the main hinge 50 with the holder 60 and may include a support rod (not shown) made of a flexible material and a flexible tube (not shown) having a bellows shape where the support rod is inserted.

Figure 4:
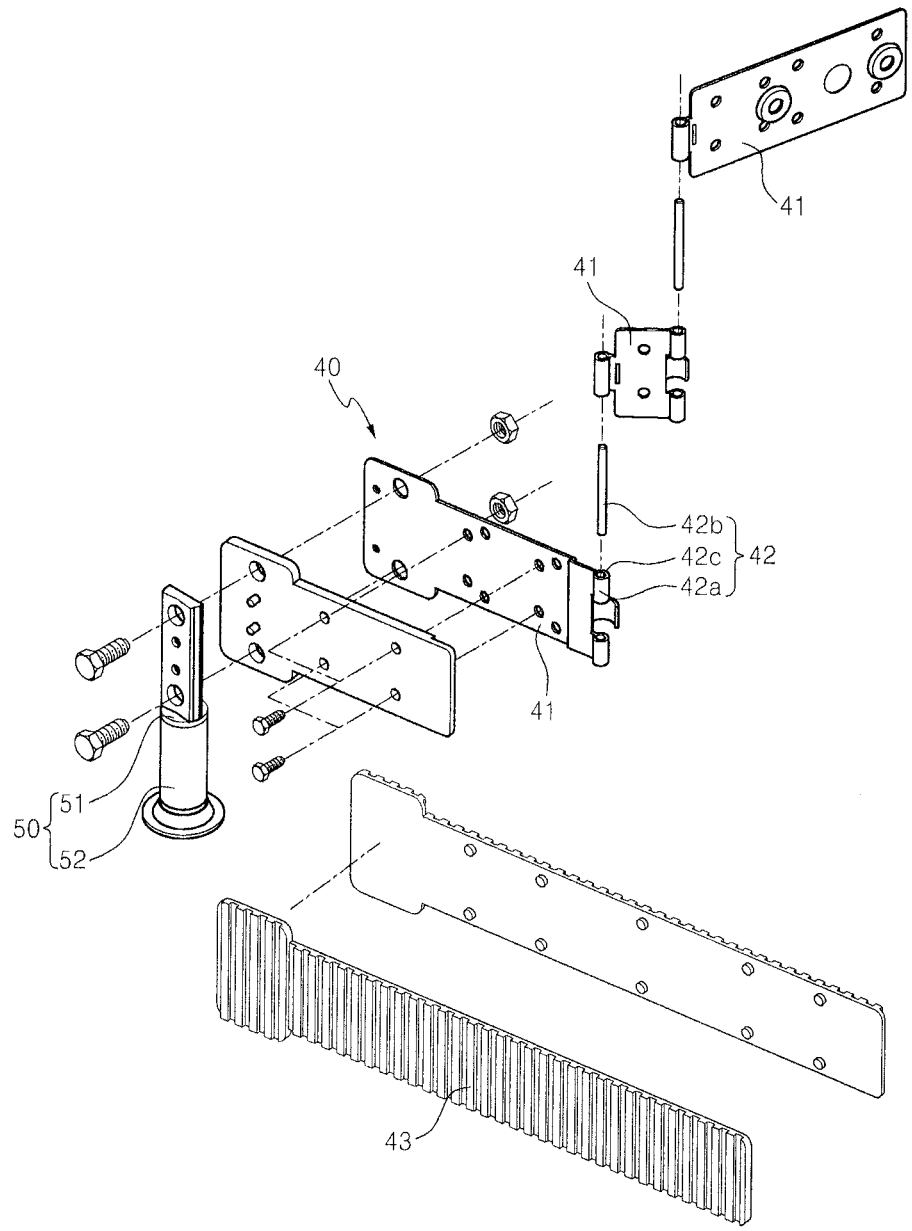
FIG. 4 is an exploded perspective view of the car audio according to an exemplary embodiment of the present invention.

Further, the support 40, as shown in FIG. 4, includes a plurality of link members 41 rotatably connected with each other.

The link members 41 are connected by the hinges 42 to be rotatable in the exemplary embodiment.

The holding unit is made of a flexible material and may further includes a cover 43 covering the support 40.

The cover 43 can be made of synthetic rubber or soft synthetic resin.

The cover 43 covers the support 40 to improve the aesthetic appearance and protect the support 40 from an external shock.

The link members 41 are formed in a plate shape and vertically arranged.

Since the link members 41 have the thin plate shape and are vertically arranged, it is possible to make the insertion space 12 thin and achieve a compact design.

The link hinge 42 allows the link member 41 to rotate only when a user intentionally applies a force to the link member 41.

Since the link hinge 42 allows the link member 41 to rotate only when the user intentionally applies a predetermined force to rotate the link member 41, it can fix the position of the link member 41, when a force is not intentionally applied.

Therefore, the device holder 60 can be fixed and maintained at the position that the user adjusts.

For example, the link hinge 42 includes a connecting member 42*a* formed at any one end of the link member 41 and having a vertical pin hole 42*c* and a pin 42*b* connects two link members 41 while passing through the pin hole 42*c* of the connecting member 42*a*.

The pin 42*b* is press-fitted in the pin hole 42*c*.

The connecting member 42 is formed such that the pin 42*b* is elastically pressed and fitted.

Two link members 41 are connected by disposing such that the pin holes 42*c* are aligned and fit the pin 42*b* in the pin holes 42*c*.

The connecting member 42*a* is formed of an elastic member with a portion of the pin hole 42*c* opened and connected by press-fitting the pin 42*b*.

That is, as the link member 41 is rotated by an intentional force larger than a force opening the connecting member 42*a*, the diameter of the pin hole 42*c* slightly increases, thereby rotating it.

Further, the position of the link member 41 is fixed in press-fitting, by the pin 42*b* pressed again by the connecting member 42*a* by a restoring force, when a force is not applied.

Meanwhile, the support 40 is connected to the main hinge 50 disposed in the car audio body 10.

The main hinge 50 includes: a main hinge shaft 51 connected to the support 40 and disposed perpendicular to the car audio body 10; and a shaft base 52 disposed in the car audio body 10 and where the main hinge shaft 51 is rotatably combined.

The main hinge shaft 51 is press-fitted in the shaft base 52.

The main hinge shaft 51 has a structure that rotates the support 40, only when the user intentionally applies a force to the support 40, in the exemplary embodiment.

The main hinge 50 fixes the main hinge shaft 51 rotated when an intentional force is not applied to the support 40, at the position.

Therefore, the device holder 60 can be fixed and maintained at the position that the user wants.

Meanwhile, the front panel unit 20 can open and close the insertion space 12, with the holding unit 30 drawn out.

A portion of the insertion space 12 is exposed, when the front panel unit 20 closes the insertion space 12.

Further, the holding unit 30 is drawn out through the exposed portion of the insertion space 12.

That is, the main hinge 50 is disposed not to interfere with the front panel unit 20.

Therefore, the front panel unit 20 can open and close the insertion space 12, with the holding unit 30 drawn out.

The present invention makes it possible to hold the portable media device 1 in the device holder 60, with the insertion space 12 closed.

Further, the present invention makes it possible to operate the audio device and view the operation status, with the portable media device 1 held in the device holder 60.

Meanwhile, the device holder 60 is rotatably connected to the support 40.

A device rotation hinge 70 where the device holder 60 is rotatably connected is provided at the other end of the support 40.

The device rotation hinge 70 includes a rotation shaft 71 protruding from any one of the other end of the support 40 and the rear of the device holder 60; and a shaft support 72 provided at the other side of the other end of the support 40 and the rear of the device holder 60 and rotatably connecting the rotation shaft 71.

Further, the device rotation hinge 70 is achieved by press-fitting the rotation shaft 71 in the shaft support 72.

The device rotation hinge 70 allows the device holder 60 to rotate, only when the user intentionally applies a force to the device holder 60.

The device holder 60 is rotated by the device rotation hinge 70 and fixed at the rotated position.

Figure 7:
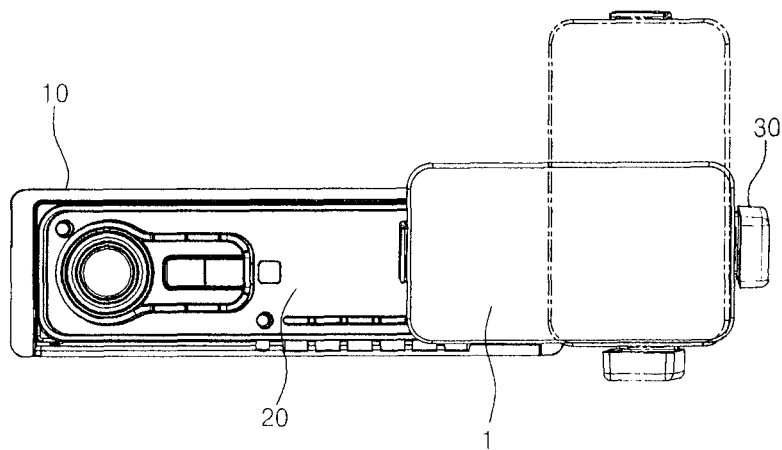

The device rotation hinge 70, as shown in FIG. 3, may be disposed at the center potion of the device holder 60, or may be disposed at one side, as shown in FIG. 7.

The direction of the screen of the portable media device 1 can be freely adjusted by rotating the device holder 60.

Meanwhile, the device holder 60 includes a base body 61 connected to the other end of the support 40; a base member 62 protruding from any one side of the base body 61; and a moving member 63 movably connected to the base body 61.

Figure 5:
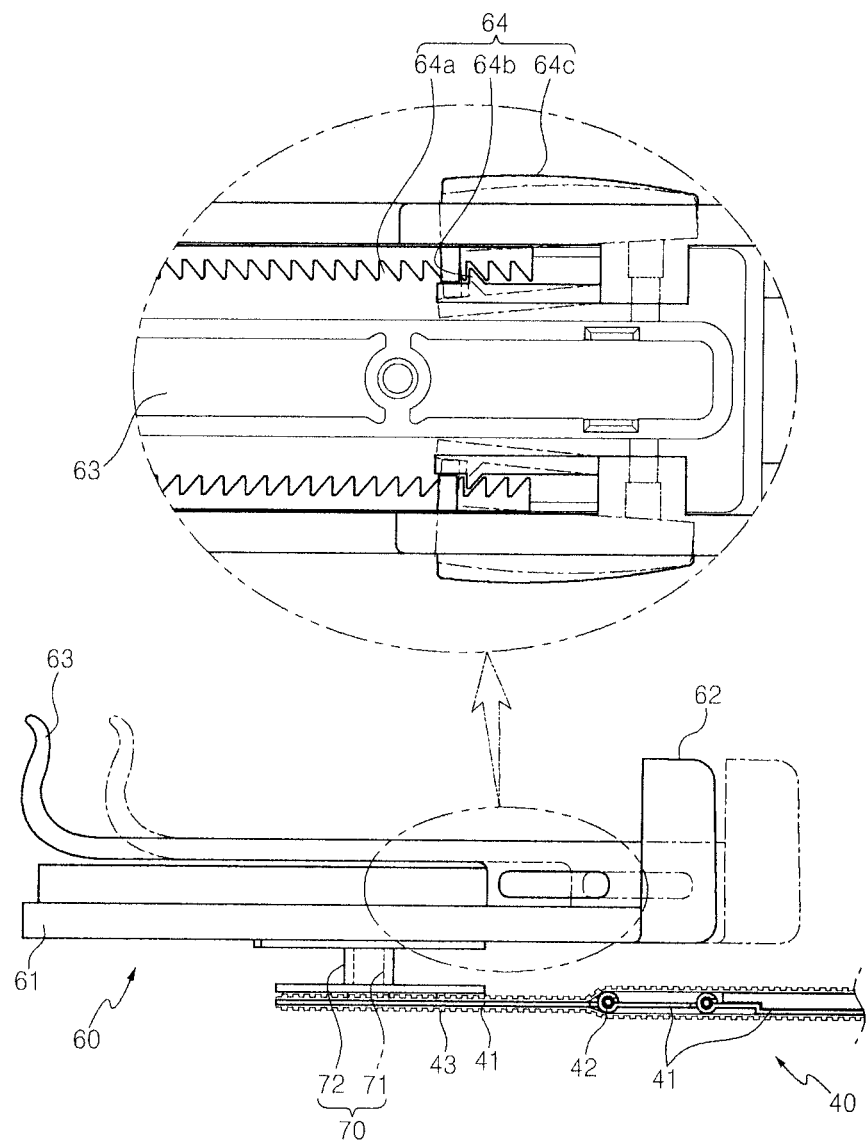
FIGS. 5 and 7 are views illustrating when the car audio according to an exemplary embodiment of the present invention is used.

As shown in FIG. 5, the base member 62 is integrally formed at any one side of the base body 61.

Further, the moving member 63 is spaced apart from the base member 62 and the distance from the base member 62 can be adjusted.

According to the exemplary embodiment of the present invention, the distance from the base member 62 is adjusted by moving the moving member 63.

The portable medial device 1 having various sizes is fixed between the base member 62 and the moving member 53.

Further, The device holder 60 may further includes a locking member 64 fixing the moving member 63 that has moved.

The locking member 64 includes: a locking guider 64a disposed in the movement direction of the moving member 63 and having a plurality of locking teeth spaced from each other on the side; a locking protrusion 64b elastically supported to be inserted between the locking teeth; and a release button 64c connected to the locking protrusion 64b and allowing the locking protrusion 64b to be separated from between the locking teeth.

The locking protrusion 64b is inserted between the locking teeth to prevent the moving member 63 from moving.

Further, the moving member 63 becomes movable while the locking protrusion 64b is separated from between the locking teeth, when the user presses the release button 64c.

Further, the locking protrusion 64b is inserted again between the locking teeth by an elastic force and prevents the moving member 63 from moving, when the release button 64c is not pressed.

Therefore, the device holder 60 can simply hold the portable media device 1 having various sizes by moving the moving member 63.

Further, though not shown, the locking member 64 may include a spring (not shown) applying an elastic force holding the portable media device 1 to the moving member 63.

According to the exemplary embodiment, the moving member 63 holds the portable medial device 1 having different sizes, using the elastic restoring force of the spring.

Meanwhile, though not shown, the present invention may further includes a terminal member (not shown) connected with the terminal connector of the portable media device 1.

The terminal member has a power terminal connected to the terminal of the portable media device 1 to supply electric power.

The power terminal makes it possible to supply electric power for charging to the portable media device 1 in a vehicle, such that it is possible to continuously use the portable media device 1.

Further, the terminal member has a control terminal for controlling the operation of the portable media device 1.

The control terminal makes it possible for an occupant to operate the portable media device 1 by using an independent media device operation unit.

The terminal member may be integrally formed with the base member 62 or may include an independent connecting cable.

The terminal member may be integrally formed with the base member 62 to seat the portable media device 1 in the base member 62 and be connected with the terminal connector of the portable media device 1.

Figure 6:
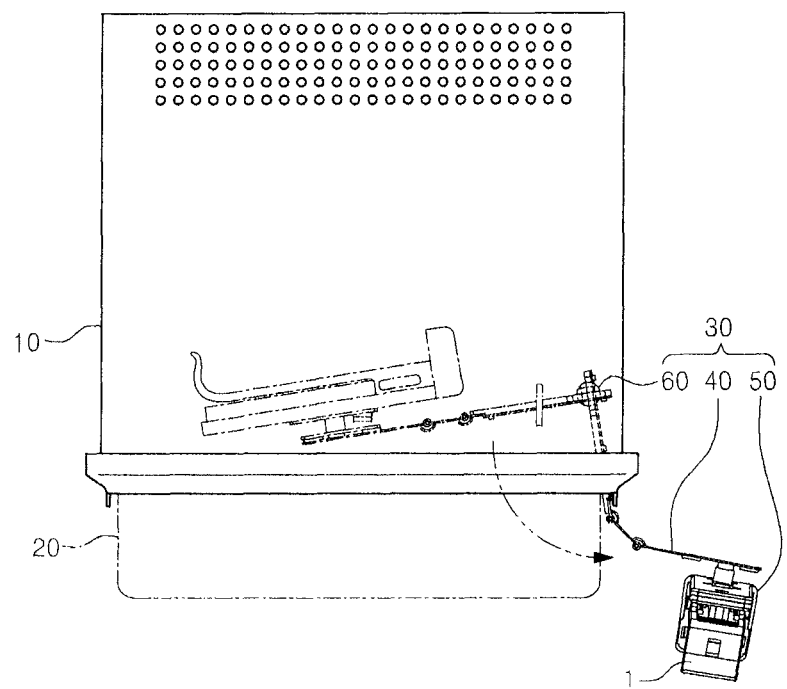

Meanwhile, the present invention simply holds the portable media device in a vehicle, as shown in FIGS. 6 and 7.

This is described as follows.

The support 40 and the device holder 60 are inserted in the insertion space 12, when not being used.

Further, the insertion space 12 is closed by the front panel unit 20.

The front panel unit 20 closes the insertion space 12 such that the support 40 and the device holder 60 are not seen from the outside.

The front panel unit 20 is released and rotated about the hinge shaft 21a, when the button 21b is pressed.

Accordingly, the insertion space 12 is opened.

With the insertion space 12 opens, the support 40 rotates about the main hinge 50 and is drawn out of the insertion space 12.

The portable media device 1 is held in the device holder 60.

The portable media device 1 can be freely adjusted to a position that the user wants, by bending the support 40 or rotating the device holder 60.

The front panel unit 20 can freely open and close the insertion space 12, with the support 40 and the device holder 60 drawn out.

That is, the holding unit 30 is drawn out, only to hold the portable media device 1 in a vehicle, in the present invention.

Further, the support 40 and the device holder 60 are inserted in the insertion space 12 and stored therein without being exposed to the outside by closing the insertion space 12.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A car audio, comprising:
   a holding unit where a portable media device is to be held;
   a car audio body having an insertion space through the front, the holding unit being inserted into the insertion space; and
   a front panel unit for opening and closing the insertion space,
   wherein the insertion space is open for drawing out the holding unit,
   wherein the holding unit includes:
      a support that is bendable,
      a main hinge that is disposed in the car audio body and where one end of the support is rotatably connected, and
      a device holder that is connected to the other end of the support to hold the portable media device.

2. The car audio according to claim 1, wherein panel hinges rotatably connected to the car audio body are provided at the sides of the front panel unit, and
   the front panel unit opens and closes the insertion space while rotating on the panel hinges.

3. The car audio according to claim 1, wherein the car audio body or the front panel unit has an expansion slot for connecting an external memory.

4. The car audio according to claim 1, wherein the support includes a plurality of link members rotatably connected with each other.

5. The car audio according to claim 1, wherein the holding unit further includes a cover made of flexible material and covering the support.

6. The car audio according to claim 4, wherein the link members are formed in plate shapes and vertically arranged.

7. The car audio according to claim 1, wherein the front panel unit opens and closes the insertion space, with the holding unit drawn out.

8. The car audio according to claim 7, wherein when the insertion space is closed by the front panel the front panel unit exposes a portion of the insertion space, and the holding unit is drawn out through the exposed portion of the insertion space.

9. The car audio according to claim 1, wherein the device holder is rotatably connected to the support.

10. The car audio according to claim 1, wherein the device holder includes:
    a base body connected to the other end of the support;
    a base member protruding from one side of the base body; and
    a moving member movably connected to the base body.

11. The car audio according to claim 10, wherein the device holder further includes a locking member fixing the position of the moving member.

12. The car audio according to claim 11, wherein the locking member includes:
    a locking guider disposed in the movement direction of the moving member and having a plurality of locking teeth spaced from each other on the side;
    a locking protrusion elastically supported to be inserted between the locking teeth; and
    a release button connected to the locking protrusion and allowing the locking protrusion to be separated from the locking teeth.

* * * * *